United States Patent
Lambert et al.

(10) Patent No.: US 10,585,816 B1
(45) Date of Patent: Mar. 10, 2020

(54) SYSTEM AND METHOD FOR SERIAL COMMUNICATION AT A PERIPHERAL INTERFACE DEVICE

(71) Applicant: DELL PRODUCTS, LP, Round Rock, TX (US)

(72) Inventors: Timothy M. Lambert, Austin, TX (US); Jordan Chin, Austin, TX (US); Jeremiah Bartlett, Austin, TX (US); Jeffrey L. Kennedy, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/213,048

(22) Filed: Dec. 7, 2018

(51) Int. Cl.
  *G06F 13/12* (2006.01)
  *G06F 13/42* (2006.01)
  *G06F 1/3215* (2019.01)

(52) U.S. Cl.
  CPC .......... *G06F 13/122* (2013.01); *G06F 1/3215* (2013.01); *G06F 13/4282* (2013.01); *G06F 2213/0026* (2013.01)

(58) Field of Classification Search
  None
  See application file for complete search history.

(56) References Cited

U.S. PATENT DOCUMENTS

| | | | |
|---|---|---|---|
| 4,655,518 A | 4/1987 | Johnson et al. | |
| 6,108,751 A | 8/2000 | Lee et al. | |
| 6,112,275 A * | 8/2000 | Curry | G01K 1/028 711/100 |
| 9,712,337 B2 * | 7/2017 | Greenwalt | G06F 1/3206 |
| 10,102,177 B2 * | 10/2018 | Yoshida | G06F 13/4282 |
| 10,261,571 B2 * | 4/2019 | Hance | G06F 1/28 |
| 10,372,197 B2 * | 8/2019 | Sistla | G06F 1/3234 |
| 10,401,946 B1 * | 9/2019 | Harland | G06F 1/26 |
| 2012/0324246 A1 * | 12/2012 | Rahardjo | G06F 1/26 713/300 |
| 2015/0032925 A1 * | 1/2015 | Chidester | G06F 13/36 710/110 |
| 2015/0127983 A1 * | 5/2015 | Trobough | G06F 11/267 714/30 |
| 2016/0055052 A1 * | 2/2016 | Hu | G06F 11/10 714/799 |
| 2018/0226051 A1 * | 8/2018 | Swaminathan | G09G 5/006 |

* cited by examiner

*Primary Examiner* — Michael Sun
(74) *Attorney, Agent, or Firm* — Larson Newman, LLP (57) ABSTRACT

An information handling system includes a planar board and a peripheral interface device. The planar board includes a central processing unit, a baseboard management controller, and an interface logic circuit. The peripheral interface device includes a microcontroller and a serial communication interface device. The peripheral interface device is coupled to a peripheral device. The information handling system also includes an interconnect to couple signals from the planar board to the peripheral interface device. The interconnect includes a single wire to couple first information from the interface logic circuit to the peripheral interface device and to couple second information from the serial communication interface device to the interface logic circuit. The first information includes a first power control command.

20 Claims, 6 Drawing Sheets

SYSTEM AND METHOD FOR SERIAL COMMUNICATION AT A PERIPHERAL INTERFACE DEVICE

FIELD OF THE DISCLOSURE

This disclosure relates generally to information handling systems, and more particularly relates to serial communication at a peripheral interface device of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

An information handling system may include a planar board and a peripheral interface device. The planar board includes a central processing unit, a baseboard management controller, and an interface logic circuit. The peripheral interface device includes a microcontroller and a serial communication interface device. The peripheral interface device is coupled to a peripheral device. The information handling system also includes an interconnect to couple signals from the planar board to the peripheral interface device. The interconnect includes a single wire to couple first information from the interface logic circuit to the peripheral interface device and to couple second information from the serial communication interface device to the interface logic circuit. The first information includes a first power control command.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system can include one or more peripheral devices, for example general-purpose graphics processing units (GPGPUs), non-volatile memory devices, network interface devices, Open Core Protocol (OCP) slot devices, and the like. The peripheral devices may couple to a high speed data link, for example a Peripheral Component Interconnect Express (PCIe) compliant data link. The PCIe data link can be provided by a central processing unit or by a chip set component included at a main circuit board of the information handling system, referred to herein as a planar board, or simply a planar. The peripheral device may be coupled to the planar using a standard or proprietary interconnect. One such interconnect standard is known as the SFF-8654, which is an interconnect standard promulgated by the Storage Networking Industry Association (SNIA) Small Form Factor (SFF) Technology Affiliate. While the SFF-8654 specification addresses most of the signaling necessary to support PCIe or similar data link protocols, the specification does not address various features, for example power control commands that may be needed to support operation of the associated peripheral device.

FIGS. 1-9 illustrate techniques for interfacing a peripheral device to a planar using a standard or proprietary interconnect. In particular, a single wire interface is disclosed that couples a logic circuit included at the planar to a microcontroller included at a peripheral interface device, the peripheral interface device coupled to a peripheral device. The single wire interface can support multiple functions, including transmission and reception of power control commands, means for the peripheral interface device to specify features and constitution of the peripheral devices to properly configure one or more associated data links, provide a capability to load or update firmware included at the microcontroller, and the like. While the disclosed techniques are applicable for use with a peripheral interface utilizing the SFF-8654 interconnect, one of skill will appreciate that these techniques are applicable to any type of interconnect where it is desired to minimize the number of cable conductors, connector pins, and the like.

Figure 1:
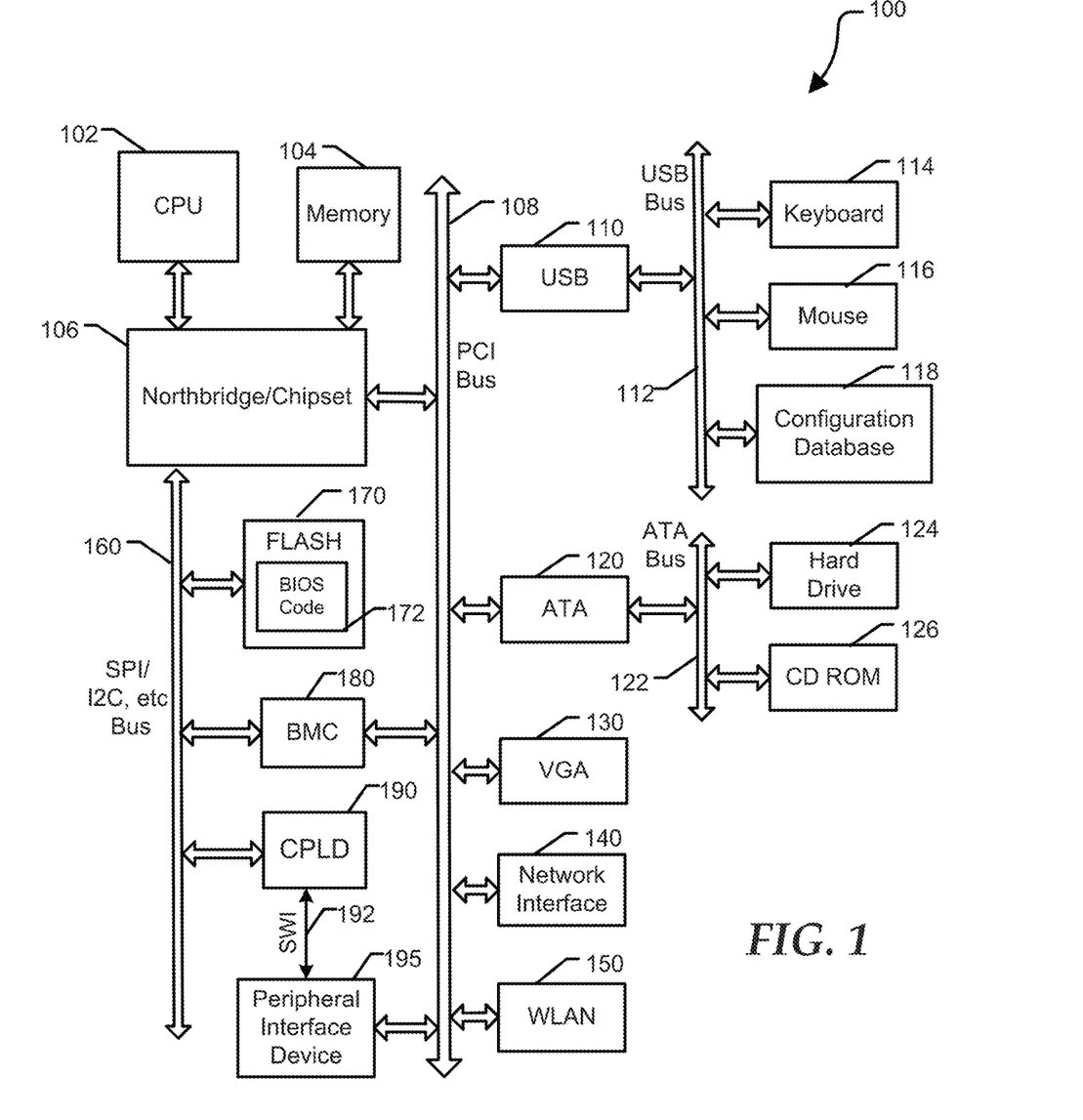
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a system bus 160, a NVRAM 170, a baseboard management controller (BMC) 180, and a complex programmable logic device (CPLD) 190 coupled to a peripheral interface device 195 by a single wire interface, SWI, 192. NVRAM 170 can store a basic input/output system (BIOS) 172. Peripheral interface device 195 can be coupled to a peripheral device (not shown at FIG. 1). System bus 160 can include one or more busses having and support one or more bus protocols, for example a serial peripheral interface (SPI) bus, an inter-integrated circuit (I2C) bus, and the like.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BMC 180 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. BMC 180 can provide a network interface, a graphical user interface (GUI) and an application programming interfaces (API) to support remote management of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100.

CPLD 190 is representative of control logic included at a planar of information handling system 100 that is configured to communicate with peripheral interface device 195. CPLD 190 is coupled to chipset 106 and peripheral interface device 195 is coupled to a PCI Bus 108. A single wire interface (SWI) 192 provides bidirectional communication between CPLD 190 and interface device 195. In an embodiment, peripheral interface device 195 can send a WAKE-ON-DEVICE (WAKE) command to CPLD 190, the command requesting all or a portion of the information handling system transition from a sleep power state to an active power state. In another embodiment, CPLD 190 can transmit a power-cessation command, (PWRBRK) to peripheral interface device 195 requesting device 195 enter a low-power operating mode.

In yet another embodiment, peripheral interface device 195 can utilize SWI 192 to transmit information to CPLD 190 specifying the features and constitution of a peripheral device supported by peripheral interface device 195. For example, peripheral interface device 195 can provide information regarding how information handling system 100 should configure a PCI data link. In still another embodiment, CPLD 190 can utilize SWI 192 to configure peripheral interface device 195 to enable installation or update of firmware executable by a microcontroller included at device 195. The operation and operating protocol of SWI 192 can vary based on a power state of information handling system 100, or in response to a transition at system 100 from one power state to another power state. For example, SWI 192 can provide a command having relatively low-latency to peripheral interface device 195 when the peripheral interface 195 is in a runtime power state, the PWRBRK command to shut down the peripheral device in the event that system 100 detects an interruption of main power.

Figure 2:
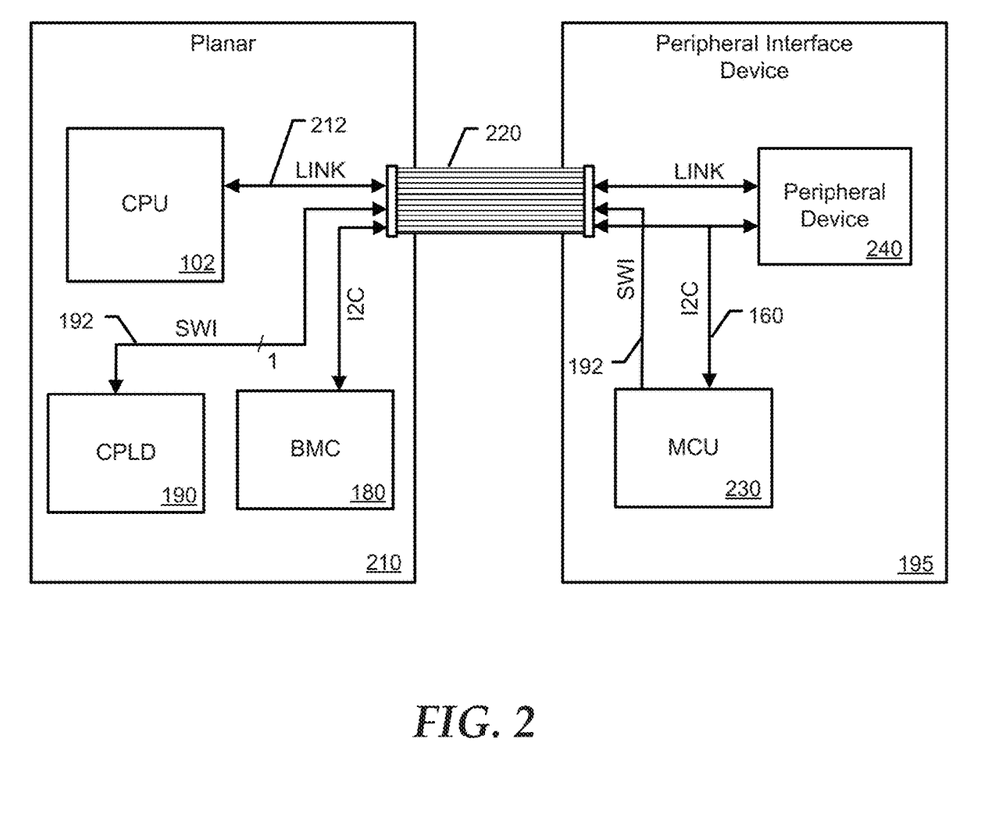
FIG. 2 is a block diagram illustrating data flow between a planar at an information handling system and a peripheral interface device according to a specific embodiment of the present disclosure.

FIG. 2 shows data flow between a planar 210 at information handling system 100 and peripheral interface device 195 according to a specific embodiment of the present disclosure. Planar 210 includes CPU 102, BMC 180, and CPLD 190. Peripheral interface device 195 includes a microcontroller unit (MCU) 230 and a peripheral device 240. Planar 210 is communicatively coupled to peripheral interface device 195 by an internal chassis interconnect 220. Interconnect 220 includes one conductor designated as SWI 192. In an embodiment, interconnect 220 can be a SFF-8654 interconnect and SWI 192 can be a ground conductor that is re-purposed to provide the SWI 192 disclosed herein. In addition to the SWI conductor, interconnect 220 includes conductors allocated to carry high speed data, LINK 212, between planar 210 and peripheral device 240, and I2C bus 160 to provide a communication channel between BMC 180 and peripheral interface device 195, including MCU 230 and peripheral device 240. In an embodiment, I2C bus 160 can be used to provide firmware instructions to MCU 230.

Link 212 can be compliant with a proprietary or standard data interface protocol, for example PCIe, Serial Attached Small Computer Interface (serial attached SCSI, also referred to as SAS), and the like. Link 212 is shown coupled to CPU 102, as modern CPUs included integrated high speed bus logic, however LINK data may be provided by other logic included at planar 210. Planar 210 and peripheral interface device 195 each receive a primary power signal and an auxiliary power signal (not shown at FIG. 2). For simplicity, a power-state nomenclature will be used to identify which power signals are active: power state G3 corresponds to a full-off condition where both the primary power signal and the auxiliary power signal are inactive; power state S5 corresponds to a sleep condition where only the auxiliary power signal is active; and power state S0 corresponds to a full-on/runtime condition where both the primary and auxiliary power signals are active.

During operation, peripheral interface device can transmit a WAKE command to CPLD, requesting that planar transition from an S5 state to an S0 state. Similarly, CPLD can transmit a PWRBRK command to peripheral interface device 195, requesting that device 195 transition from an S0 state to an S5 state. When peripheral interface device 195 is in an S5 state, device 195 is capable of sending relatively long payloads of information, for example information identifying the operating characteristics of peripheral device 240. In contrast, when peripheral interface device 195 is operating in an S0 state, device 195 can be configured to transmit relatively short payloads. Furthermore, device 195 can be configured to listen for commands from CPLD 190 after transmitting each data byte of a payload, so that CPLD 190 can provide commands to device 195 with low latency. All packets transmitted by peripheral interface device 195 include a header. The header can include information identifying the transmitter's identity, a size of the packet payload, the WAKE command, NVME_PRES signals, and the like. Further operating details are described below with reference to FIGS. 3-9.

Figure 3:
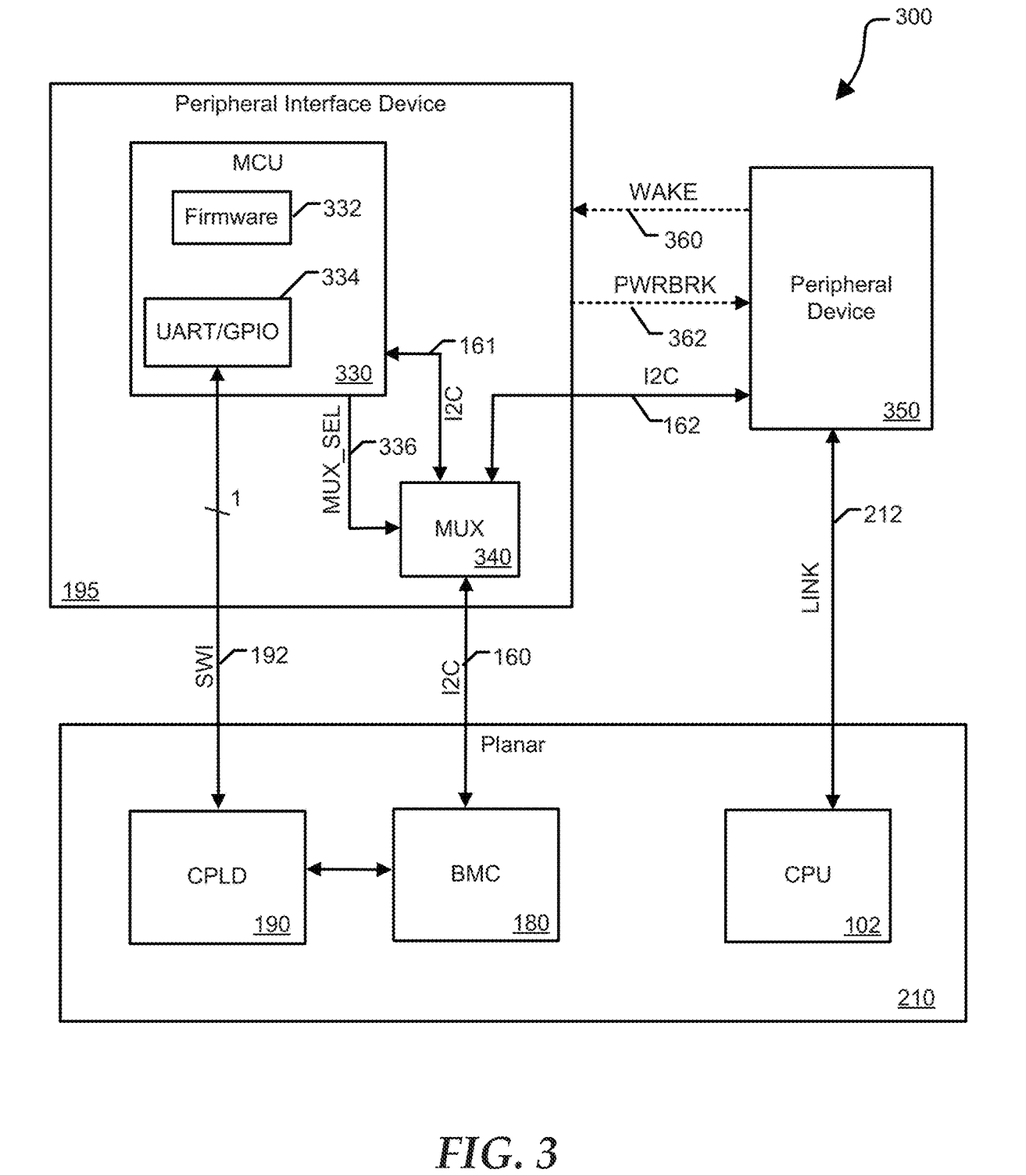
FIG. 3 is a block diagram illustrating a planar and a peripheral interface device according to a further embodiment of the present disclosure.

FIG. 3 shows planar 210 and peripheral interface device 195 according to a further embodiment of the present disclosure. Planar 210 includes CPU 102, BMC 180, and CPLD 190. Peripheral interface device 195 includes an MCU 330 and a multiplexor (MUX) 340. MCU 330 includes firmware 332 and a universal asynchronous receiver-transmitter (UART) and general purpose I/O (GPIO) 334. MCU 330 includes an output to provide a multiplexor-select signal MUX_SEL 336 to MUX 340. FIG. 3 also shows a peripheral device 350 that is coupled to MUX 340 by I2C bus 160. UART/GPIO 334 is coupled to CPLD 190 via SWI 192. In an embodiment, MCU 330 can include a GPIO terminal that is coupled to SWI 192, so that MCU can monitor a logic state of SWI 192. MUX 340 includes an input to receive I2C bus 160 from BMC 180, a first output to selectively couple I2C bus 160 to MCU 330, and a second output to selectively couple I2C bus 160 to peripheral device 350. MUX 340 couples I2C bus 160 from BMC 180 to one of I2C bus 161 coupled to MCU 330 or I2C bus 162 coupled to peripheral device 350 based on MUX_SEL 336. In an embodiment, UART/GPIO 334 can provide half-duplex with parity capability to transmit packetized information to CPLD 190. UART/GPIO 334 is configured to transmit payloads, each payload made up of units including UART start, data, parity, and stop signaling.

In an embodiment, CPLD 190 can overdrive SWI 192 by pulling SWI 192 to a logic low state to provide an acknowledgement of receipt of a packet from MCU 320, to provide a PWRBRK command to MCU 320, to configure MCU 330 for a firmware update, and the like. In an embodiment, CPLD 190 can support multiple peripheral interface devices 190. For example, CPLD 190 can include a single UART receiver that can multiplex in a round-robin fashion between SWI interfaces corresponding to each of the multiple devices 190. As further described below, peripheral device 350 can initiate a wake-on event, represented at FIG. 3 by WAKE 360, and CPLD 190 can initiate a power-down event, represented by PWRBRK 362. In addition, CPLD 190 can command peripheral interface device to configure MUX 340 to enable BMC 180 to upload firmware to MCU 330 over I2C bus 160/161.

Figure 4:
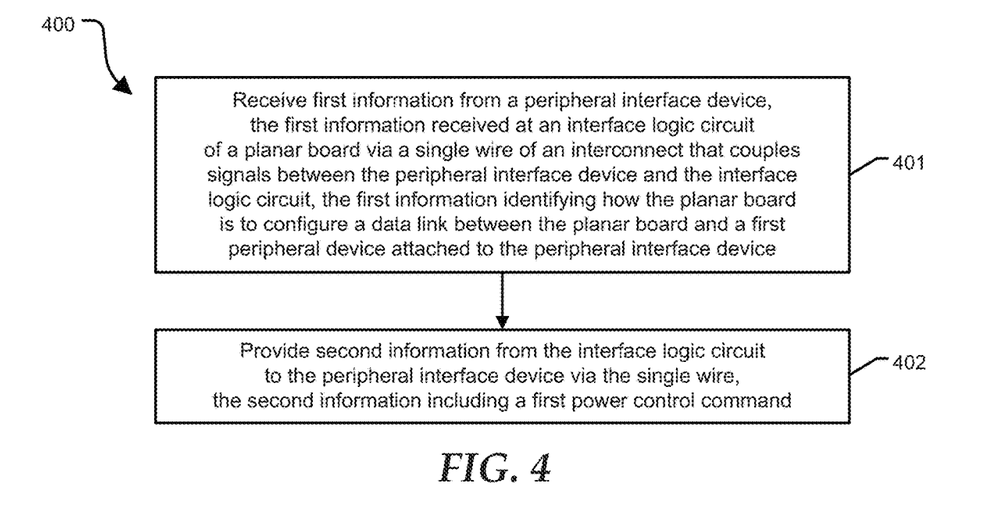
FIG. 4 is a flow diagram illustrating a method for sending and receiving information over a single wire interface according to a specific embodiment of the present disclosure.

FIG. 4 shows a method 400 for sending and receiving information over a single wire interface according to a specific embodiment of the present disclosure. Method 400 begins at block 401 where first information is received from a peripheral interface device via a single wire of an interconnect coupling signals between the peripheral interface device and an interface logic circuit of a planar board. The first information is received at the interface logic circuit identifies how the planar board is to configure a data link between the planar board and a first peripheral device attached to the peripheral interface device. For example, peripheral interface device 195 can use UART/GPIO 334 to transmit a packet to CPLD 190 via SWI 192, the packet including a payload containing information identifying peripheral device 240 and defining how to configure link 212. Method 400 completes at block 402 where the interface logic circuit provides second information to the peripheral interface device via the single wire, the second information including a first power control command. For example, CPLD 190 can issue a PWRBRK command over SWI 192 requesting that peripheral device 240 transition to a sleep state.

Figure 5:
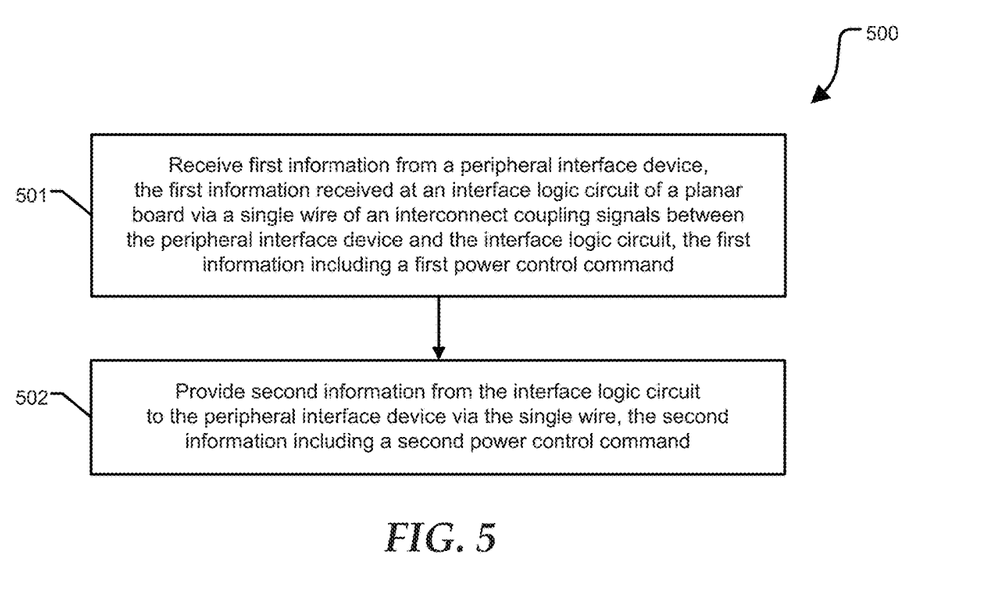
FIG. 5 is a flow diagram illustrating a method for sending and receiving information over a single wire interface according to another embodiment of the present disclosure.

FIG. 5 shows a method 500 for sending and receiving information over a single wire interface according to another embodiment of the present disclosure. Method 500 begins at block 501 where first information is received from a peripheral interface device via a single wire of an interconnect coupling signals between the peripheral interface device and an interface logic circuit of a planar board. The first information is received at the interface logic circuit and includes a first power control command. For example, peripheral device 240 can initiate a wake-on command to planar 210 using UART/GPIO 334 via SWI 192. Method 500 completes at block 502 where the interface logic circuit provides second information to the peripheral interface device via the single wire, the second information including a second power control command. For example, CPLD 190 can issue a PWRBRK command over SWI 192 requesting that peripheral device 240 transition to a sleep.

Figure 6:
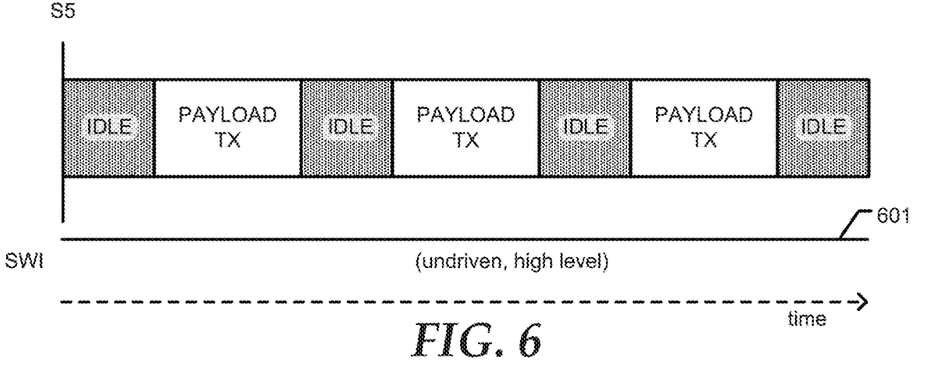
FIG. 6 is a timing diagram illustrating transmission of data packets over a single wire interface according to a specific embodiment of the present disclosure.

FIG. 6 shows a transmission of data packets over a single wire interface according to a specific embodiment of the present disclosure. In particular, FIG. 6 illustrates transmission of a sequence of payloads by peripheral interface device 195 to CPLD 190 via SWI 192 while peripheral interface device 195 and peripheral device 240 are operating in a sleep state, S5. The transmission of each payload is followed by an idle time during which time device 195 does not transmit information over SWI 192. FIG. 6 includes a timing diagram and waveform 601 representing control of SWI 192 by CPLD 190. Waveform 601 shows that during this time CPLD 190 does not modify the state of SWI 192. Payloads transmitted by peripheral interface device 195 during state S5 can be sent in their entirety in a single burst, and the transmission can include a relatively large number of bytes of information, for example 128 bytes. Each payload includes a header, and the header can include dynamic information. Dynamic information is information that can change during runtime operation of peripheral interface device 195, for example hot-plug presence, a wake-on indicator, and the like. During state S5, peripheral interface device can transmit static information, for example information identifying the identity and operating characteristics of peripheral device 240. The entire payload is transmitted contiguously and CPLD 190 does not need to provide an acknowledgment response.

Figure 7:
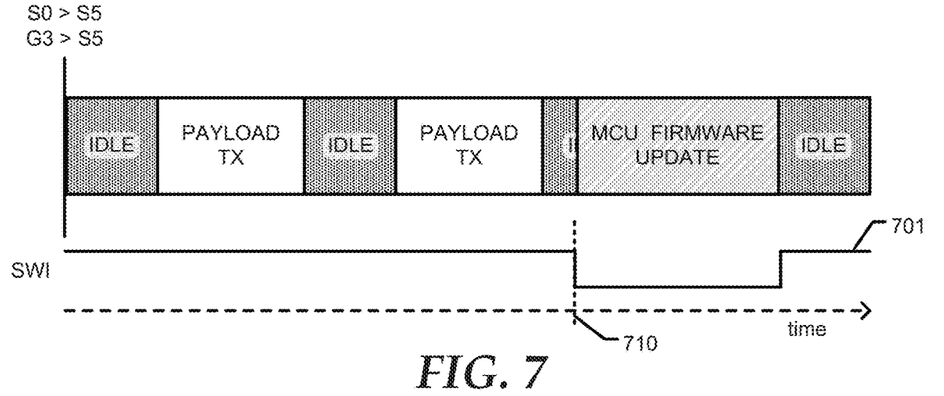
FIG. 7 is a timing diagram illustrating transmission of data packets over a single wire interface according to another embodiment of the present disclosure.

FIG. 7 shows a transmission of data packets over a single wire interface according to another embodiment of the present disclosure. In particular, FIG. 7 illustrates how CPLD can configure peripheral interface device 195 to update firmware at MCU 230 when peripheral interface device 195 and peripheral device 240 are operating in a sleep state, S5. FIG. 7 includes a timing diagram and waveform 701 representing control of SWI 192 by CPLD 190. At time reference 710, CPLD 190 drives SWI 192 to a logic-low level, for example a ground voltage level, overdriving/overwriting transmission over SWI 192 by UART/GPIO 334 at peripheral interface device 195. When peripheral interface device 195 is operating in state S5, MCU 230 can utilize a general purpose I/O terminal or another technique to sample a voltage level at SWI 192 after transmitting the payload. Alternatively, SWI 192 can be sampled after transmitting each unit of the payload. Accordingly, a payload can be interrupted before the full header has been transmitted. In response to detecting that CPLD 190 is driving SWI 192 to a ground voltage level, MCU 330 can stop sending payloads and assert signal MUX_SEL 336, causing MUX 340 to couple I2C bus 160 to I2C bus 161, and thereby provide access by BMC 180 to MCU 330. BMC 180 can then proceed to update firmware 332 at MCU 330. MCU 330 can continue to sample SWI 192 until CPLD 190 releases SWI 192 back to a high logic level. Once SWI 192 is released by the CPLD 190, MCU 330 can resume sending payloads and associated idle periods.

Figure 8:
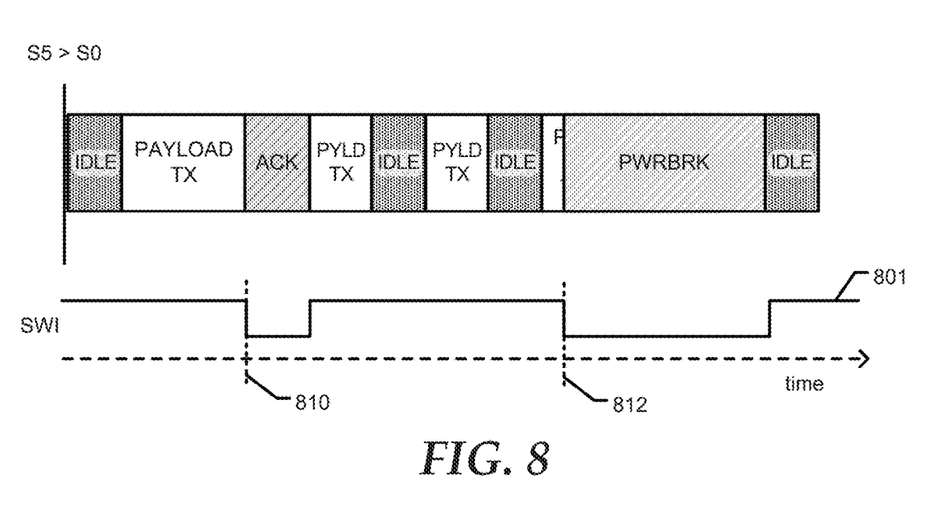
FIG. 8 is a timing diagram illustrating transmission of data packets over a single wire interface according to yet another embodiment of the present disclosure.

FIG. 8 shows a transmission of data packets over a single wire interface according to yet another embodiment of the present disclosure. In particular, FIG. 8 illustrates operation of the SWI 192 interface when peripheral interface device 195 and peripheral device 240 are operating in runtime state S0, and in particular, how CPLD 190 can command peripheral device 350 to transition to a sleep state by issuing a PWRBRK command. FIG. 8 includes a timing diagram and waveform 801 representing control of SWI 192 by CPLD 190. At time reference 810, CPLD 190 drives SWI 192 to a logic-low level to acknowledge (ACK) successful receipt of a first payload from MCU 330 following transition of peripheral interface device 195 from sleep state S5 to runtime state S0. In an embodiment, CPLD 190 only issues an ACK if peripheral interface device is operating in state S0, CPLD 190 has received a full payload, and CPLD 190 has verified that the payload was received accurately. For example, CPLD 190 can utilize cyclic redundancy code (CRC) techniques to determine that no errors occurred during transmission. Following the receipt of the ACK at MCU 330, MCU 330 can resume transmission of payloads, each followed by an associated idle period. In an embodiment, the payloads transmitted after receipt of the ACK include only a header, which can include dynamic information, and may not include static information.

In an embodiment, payloads transmitted by peripheral interface device 195 when operating in runtime state S0 include a fewer number of bytes relative to the number of bytes included in payloads when operating in sleep state S5. When operating in runtime state S0, MCU 330 can transmit payload information as a sequence of single bytes, each byte followed by an idle period. During each idle period, MCU 330 can monitor SWI 192 to determine whether CPLD 190 is driving SWI 192 to a ground voltage level, now indicative of a PWRBRK command. In response to receiving a PWRBRK command, peripheral interface device transitions to sleep state S5. CPLD 190 drives SWI 192 asynchronously with respect to the timing of UART/GPIO 334. In an embodiment, peripheral interface device 195 can remain in state S5 until CPLD 190 again drives SWI 192 to a ground voltage level.

Figure 9:
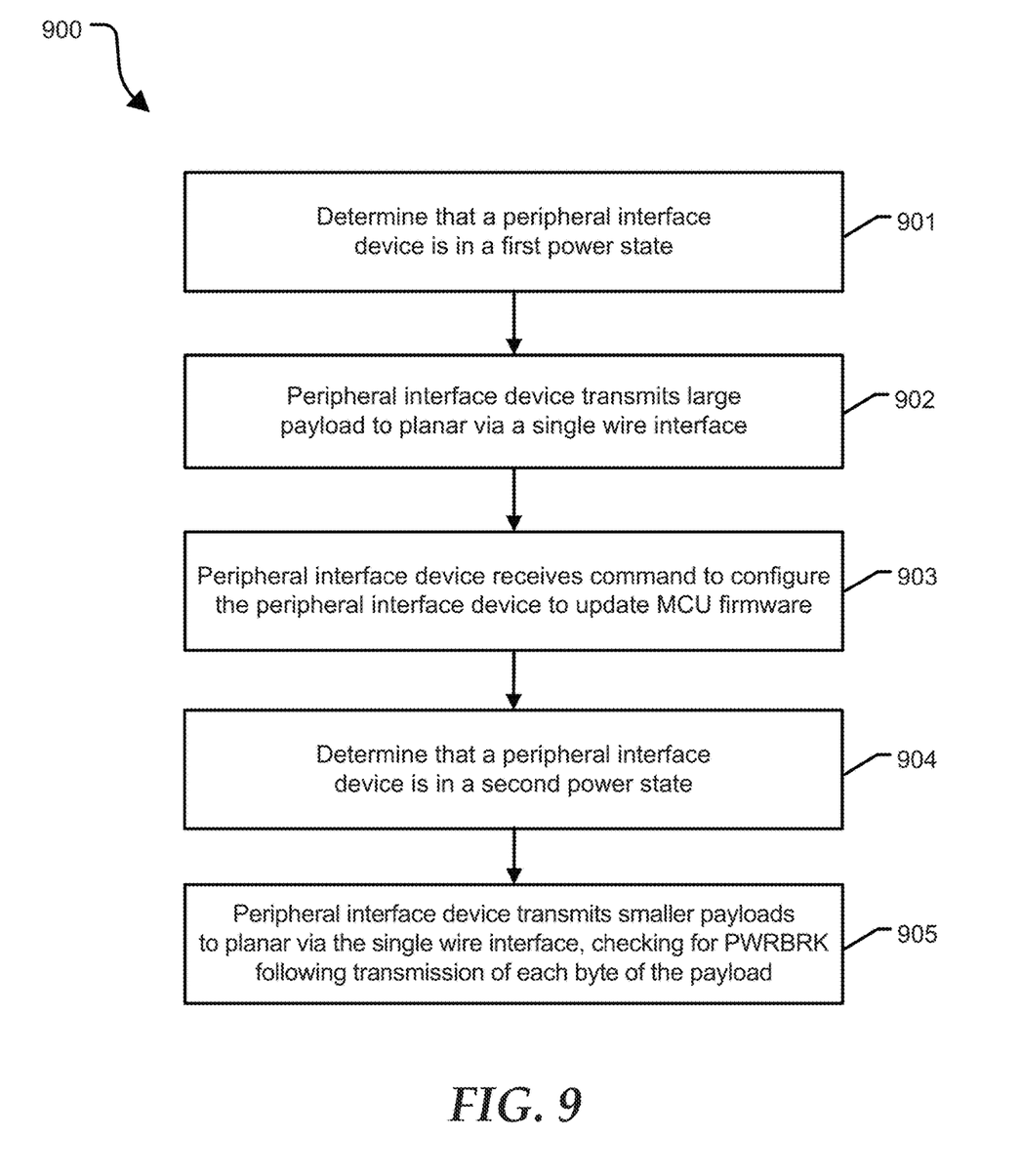
FIG. 9 is a flow diagram illustrating a method for sending information over a single wire interface according to a specific embodiment of the present disclosure.

FIG. 9 shows a method 900 for sending information over a single wire interface according to a specific embodiment of the present disclosure. Method 900 begins at block 901 where it is determined at a peripheral interface device that the device is operating in a first power state. For example, peripheral interface device 195 can be operating in sleep state S5. At block 902, the peripheral interface device transmits large payloads to a planar device. For example, peripheral interface device can transmit payloads as described with reference to FIG. 6. At block 903, the peripheral interface device receives a command from the planar, the command to configure the peripheral interface device to update MCU firmware. For example, CPLD 190 can drive SWI 192 as described with reference to FIG. 7. At block 904, it is determined at a peripheral interface device that the device is operating in a second power state. For example, peripheral interface device 195 can be operating in runtime state S0. Method 900 completes at block 905 where the peripheral interface device transmits smaller payloads, relative to the larger payloads of block 902, and checks for a PWRBRK command following transmission of each byte of the payload. For example, MCU 330 can monitor SWI 192 as described with reference to FIG. 8.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a planar board including a central processing unit, a baseboard management controller, and an interface logic circuit;
 a peripheral interface device including a microcontroller and a serial communication interface device, the peripheral interface device coupled to a peripheral device; and an interconnect to couple signals between the planar board and the peripheral interface device, the interconnect including a single wire to communicate first information from the interface logic circuit to the peripheral interface device and to communicate second information from the serial communication interface device to the interface logic circuit, the first information including a first power control command, wherein the serial communication interface device operates in a first mode if the peripheral interface device is receiving only auxiliary power and operates in a second mode if the peripheral interface device is receiving both auxiliary power and main power.

2. The information handling system of claim 1, wherein the first information includes a PCIe PWRBRK command.

3. The information handling system of claim 1, wherein the first information includes a command to configure the peripheral interface device to receive firmware executable by the microcontroller.

4. The information handling system of claim 1, wherein the second information includes a second power control command.

5. The information handling system of claim 1, wherein the second information includes operating characteristics of the peripheral device including information identifying how the planar board is to configure a data link between the planar board and the peripheral device.

6. The information handling system of claim 1, wherein the second information includes a PCIe WAKE command.

7. The information handling system of claim 1, wherein the peripheral interface device is configured to listen for the first information following transmission of each byte of data.

8. The information handling system of claim 1, wherein the peripheral interface device is configured to listen for the first information following transmission of each byte of data if the peripheral device is receiving both auxiliary power and main power.

9. The information handling system of claim 1, wherein the interconnect includes a plurality of signal wires that are compliant with a standard interconnect specification and the single wire is a repurposed ground wire of the standard interconnect specification.

10. A method comprising:
receiving first information from a peripheral interface device, the first information received via a single wire of an interconnect coupling signals between the peripheral interface device and an interface logic circuit of a planar board, the first information identifying how the planar board is to configure a data link between the planar board and a peripheral device attached to the peripheral interface device; and providing second information from the interface logic circuit to the peripheral interface device via the single wire, the second information including a first power control command, wherein the peripheral interface device is configured to listen for the first information following transmission of each byte of data when the peripheral interface device is receiving both auxiliary power and main power.

11. The method of claim 10, wherein the second information includes a PCIe PWRBRK command.

12. The method of claim 10, wherein the second information includes a command to configure the peripheral interface device to receive firmware executable by the microcontroller.

13. The method of claim 10, wherein the first information further includes a second power control command.

14. The method of claim 10, wherein the first information further includes a PCIe WAKE command.

15. The method of claim 10, wherein the peripheral interface device is configured to listen for the first information following transmission of each byte of data.

16. The method of claim 10, wherein the peripheral interface device includes a serial communication interface device for transmitting the first information, the serial communication interface device operating in a first mode if the peripheral interface device is receiving only auxiliary power and operates in a second mode if the peripheral device is receiving both auxiliary power and main power.

17. The method of claim 10, wherein the interconnect includes a plurality of signal wires that are compliant with a standard interconnect specification and the single wire is a repurposed ground wire of the standard interconnect specification.

18. A method comprising:
receiving first information from a peripheral interface device, the first information received via a single wire of an interconnect coupling signals between the peripheral interface device and an interface logic circuit of a planar board, the first information including a first power control command; and providing second information from the interface logic circuit to the peripheral interface device via the single wire, the second information including a second power control command, wherein the interconnect includes a plurality of signal wires that are compliant with a standard interconnect specification and the single wire is a repurposed ground wire of the standard interconnect specification.

19. The method of claim 18, wherein the first information includes a PCIe WAKE command.

20. The method of claim 18, wherein the second information includes a PCIe PWRBRK command.

* * * * *